(12) United States Patent
Heath

(10) Patent No.: US 9,711,838 B2
(45) Date of Patent: Jul. 18, 2017

(54) INDEXED CENTERING SPACER FOR COAXIAL PROBES IN GUIDED WAVE RADAR LEVEL TRANSMITTERS

(71) Applicant: Honeywell International Inc., Morris Plains, NJ (US)

(72) Inventor: Stuart James Heath, Surrey (CA)

(73) Assignee: Honeywell International Inc., Morris Plains, NJ (US)

( * ) Notice: Subject to any disclaimer, the term of this patent is extended or adjusted under 35 U.S.C. 154(b) by 58 days.

(21) Appl. No.: 14/926,584

(22) Filed: Oct. 29, 2015

(65) Prior Publication Data
US 2017/0125872 A1    May 4, 2017

(51) Int. Cl.
| G01F 23/284 | (2006.01) |
| H01P 5/08 | (2006.01) |
| H01P 11/00 | (2006.01) |
| H01R 13/73 | (2006.01) |
| G01R 1/067 | (2006.01) |

(52) U.S. Cl.
CPC ............. *H01P 5/08* (2013.01); *H01P 11/00* (2013.01); *H01R 13/73* (2013.01)

(58) Field of Classification Search
CPC .......................... G01F 23/284; G01R 1/06783
USPC ....................... 342/124, 175, 755.01, 755.02
See application file for complete search history.

(56) References Cited

U.S. PATENT DOCUMENTS

| 3,822,609 | A | 7/1974 | Kotoc |
| 4,213,492 | A | 7/1980 | Guebert |
| 5,331,725 | A | 7/1994 | Chou |
| 5,595,218 | A | 1/1997 | Hallbach et al. |
| 5,943,908 | A * | 8/1999 | Innes ............ G01F 23/284 324/632 |
| 6,584,725 | B1 | 7/2003 | Elam |
| 6,962,470 | B2 | 11/2005 | Anscher |
| 7,392,699 | B2 * | 7/2008 | Motzer ............ B08B 1/008 73/290 R |
| 7,450,055 | B2 * | 11/2008 | Eriksson ......... G01F 23/284 342/124 |
| 8,393,208 | B2 * | 3/2013 | Miskell ........... G01F 23/284 73/290 V |

(Continued)

OTHER PUBLICATIONS

PCT International Search Report for PCT/US2016/057905 dated Feb. 2, 2017.

*Primary Examiner* — Dean Takaoka
(74) *Attorney, Agent, or Firm* — Richard H. Krukar; Kermit D. Lopez; Luis M. Ortiz

(57) ABSTRACT

Coaxial probes for guided wave radar level transmitters have an inner rod within an outer tube. Transmission line impedance changes where the space between the two fills with process fluid, causing a reflection of radar energy. Time of flight calculations yield the distance to the product and thus the level of the fluid in a tank. The inner rod and outer rod should maintain their spacing because a reflection can occur if the inner rod moves too close to the outer tube wall. Spacers can maintain the spacing. The spacers should be retained so that their location over time doesn't change. Retention strategies involving shoulders or discontinuities in the inner rod or outer tube can cause measurement errors. Applications requiring high temperature resistance and high chemical compatibility lead to ceramic spacers instead of plastic spacers. Slip fits are needed when ceramics are too stiff for snap-in functionality.

20 Claims, 4 Drawing Sheets

(56) References Cited

U.S. PATENT DOCUMENTS

| | | | |
|---|---|---|---|
| 9,453,755 B2* | 9/2016 | Lavon | G01F 23/284 |
| 2005/0268715 A1 | 12/2005 | Sabatino | |
| 2006/0225499 A1 | 10/2006 | Gravel et al. | |
| 2007/0090992 A1 | 4/2007 | Edvardsson | |
| 2012/0216375 A1 | 8/2012 | Druhl | |
| 2013/0314275 A1 | 11/2013 | Fredriksson et al. | |
| 2016/0069729 A1* | 3/2016 | Wardas | G01F 23/284 |
| | | | 342/124 |
| 2016/0320223 A1* | 11/2016 | Heath | G01F 23/284 |
| 2016/0334262 A1* | 11/2016 | Haran | G01F 23/284 |

\* cited by examiner

INDEXED CENTERING SPACER FOR COAXIAL PROBES IN GUIDED WAVE RADAR LEVEL TRANSMITTERS

FIELD OF THE INVENTION

Embodiments are generally related to guided wave radar level transmitters, utilizing coaxial probes.

BACKGROUND

Guided wave radar level transmitters are used to measure fluid levels in closed tanks, open tanks, reservoirs, and other environments. A guided wave radar level transmitter sends a short Radio frequency ("RF") pulse along a probe that penetrates into the tank containing the product to be measured. The RF pulse is reflected off of the product surface back to the GWR electronics. The time of flight of the pulse is used to calculate the position of the product surface, and thus the product level can be determined. The coaxial type of GWR probe is comprised of an inner rod conductor and a coaxial tube. The RF electronics can be attached with the signal passing into the sensor's inner conductor while the outer conductor is connected to ground. The RF pulse's field is contained within the outer conductor making coaxial probes insensitive to surrounding obstructions that would interfere with other probe types (such as wire or rod probes).

The coaxial probes have an inner rod, an outer tube, and a spacer that centers the rod within the shell. The spacers cannot be solid because solid spacers prevent the fluid from flowing up the inside of the probe between the inner rod and the outer tube. The spacers should also be restricted from moving up and down the inner rod. Some retention strategies use discontinuities, such as shoulders, detents, or indentations to restrict spacer movement. These discontinuities can cause measurement errors. Systems and methods for improved spacer retention are needed.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments that a guided wave radar fluid measurement system has a coaxial probe. The coaxial probe has an inner rod substantially centered within an outer tube. The inner rod can be made of two or more sections that attach end to end. The ends of the inner rod sections can have internal thread such that each rod is screwed onto a threaded rod and thereby attached. In another embodiment, one section can have external thread and the other internal threads such that the sections are screwed together without requiring separate threaded rods.

It is another aspect of the embodiments that the inner rod sections have circular cross-sections across their entire lengths except for at the ends where the sections can have diametrically opposed flats such that open ended wrenches can be used to tighten the rods together.

It is another aspect of the embodiments that spacers can be slid onto the inner rod ends where the cross-section is non-circular. The spacers can have an inner bore shaped like the non-circular cross-section and sized to slide onto an inner rod section. The shape of the inner bore prevents the spacers from sliding onto the inner rod parts having circular cross-sections. In many embodiments, the spacers have flow channels such that fluid can flow through the flow channels from one inner rod section to another.

It is a further aspect of the embodiments that the inner rod is positioned inside an outer tube. The inner rod is assembled from inner rod sections threaded together end-to-end with spacers between at least some of the inner rod sections. In many embodiments, the inner rod is slid into the outer tube from one end. In other applications, the outer tube is also made of sections that thread together and the coaxial probe can be assembled by, for example, attaching an inner rod section and then an outer rod section repeatedly and in turn until the desired probe length is reach. Spacers must be included, as discussed above, to ensure that the inner rod is substantially centered in the outer tube.

A yet further aspect of some embodiments is that a washer restricts the spacers from moving from one inner rod section to another. The washer can be installed between tube sections and can be shaped such that the spacer's inner bore cannot fit over the washer. The washer can have an outer diameter that equals, or is less than, that of the circular cross-section of the inner rod sections. The washer can also be a lock washer.

Another aspect of some embodiments is that there is a flow channel between the outer tube and the spacer. The flow channel can be a gap along the outer circumference of the spacer.

The spacers must be nonconductive and substantially impervious to whatever fluid is being measured. High temperature application or applications with particularly aggressive process fluids may require ceramic or aluminum oxide spacers. Note that many ceramics comprise aluminum oxide. For example, a spacer can be formed from sintered aluminum oxide powder. PTFE can also be a good choice of spacer material when conditions allow, although some applications require more exotic materials like PEEK, ceramic, or alumina.

The inner rod, washer, and the outer tube must also be substantially impervious to whatever fluid is being measured. Stainless steel is often a good choice. Particularly harsh conditions may require a more exotic alloy such as a superalloy or a material similar to Monel. Monel alloys are certain nickel alloys having at least 62% nickel and 27% copper. Examples of superalloys are Hastelloy, Inconel (e.g., IN100, IN600, IN713), Waspaloy, Rene alloys (e.g., Rene 41, Rene 80, Rene 95, Rene N5), Haynes alloys, Incoloy, MP98T, TMS alloys, and CMSX (e.g., CMSX-4) single crystal alloys.

It is a still yet further aspect that certain embodiments enhance fluid flow into the probe by having holes or perforations in the outer tube.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Coaxial probes for guided wave radar level transmitters have an inner rod within an outer tube. Transmission line impedance changes where the space between the two fills with process fluid, causing a reflection of radar energy. Time of flight calculations yield the distance to the product and thus the level of the fluid in a tank. The inner rod and outer rod should maintain their spacing because a reflection can occur if the inner rod moves too close to the outer tube wall. Spacers can maintain the spacing. The spacers should be retained so that their location over time doesn't change. Retention strategies involving shoulders or discontinuities in the inner rod or outer tube can cause measurement errors. Applications requiring high temperature resistance and high chemical compatibility lead to ceramic spacers instead of plastic spacers. Slip fits are needed when ceramics are too stiff for snap-in functionality.

Figure 1:
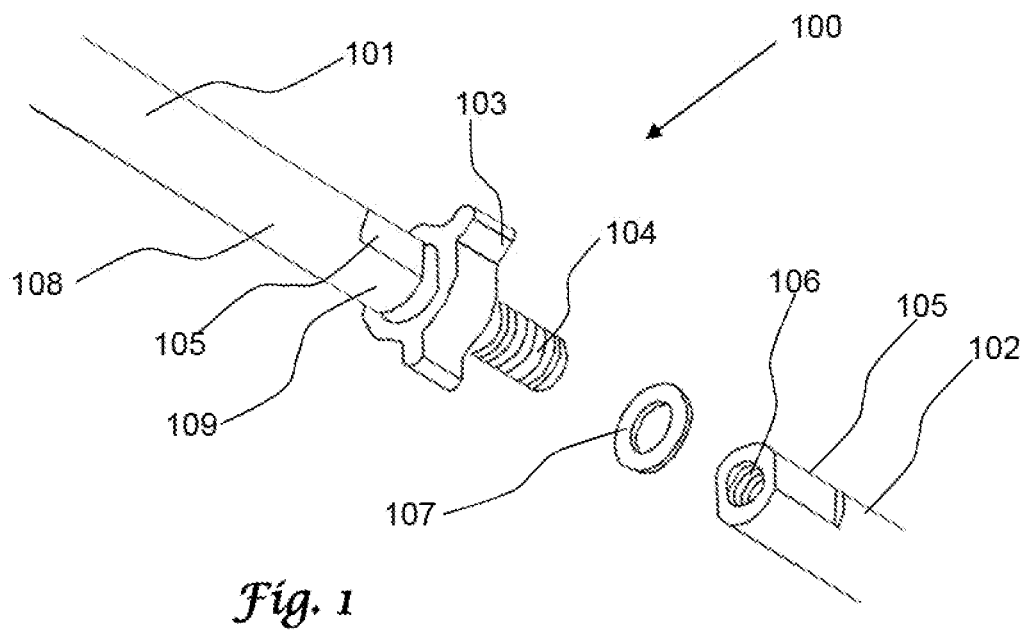
FIG. 1 illustrates an exploded view of an inner rod assembly with a spacer and washer in accordance with aspects of the embodiments.

FIG. 1 illustrates an exploded view of an inner rod assembly 100 with a spacer 103 and washer 107 in accordance with aspects of the embodiments. A separate threaded rod 104 of a first inner rod section 101 is illustrated that can pass through the hole in washer 107 and can be threaded into internal threads 106 of a second inner rod section 102. The inner rod sections can have a rod body 108 and rod end 109. The rod body 108 can have a circular cross-section while the rod end 109 has a non-circular cross-section because it has two diametrically opposed flats 105. The spacer 103 has an inner bore that fits over the rod end 109, but cannot fit over the rod body 108. As such, during a typical assembly of the inner rod assembly, the spacer 103 can be slid onto a rod end 109 of a first rod section 101, the threaded rod 104 threaded into the rod end 109, the washer slipped onto the threaded rod, and the threaded rod threaded into the internal threads 106 of a second rod section 102. The washer 107 prevents the spacer from sliding onto the end of the second rod section 102. Typically, the washer has a diameter similar to the rod body 108 and in many embodiments will have a diameter equaling that of the rod body 108. The washer should not have a diameter equal to or less than the distance between the diametrically opposed flats because such a diameter will not restrict the spacer from sliding onto the end of the second section. In many embodiments, the washer is a lock washer. In addition, the diametrically opposed flats can be configured such that open end wrenches can be used to tighten the inner rod section together.

In most applications, it is desirable that the spacer be formed from a nonconductive material such as ceramic, alumina, PTFE, or PEEK. Alumina, also known as aluminum oxide, is obtainable in a powdered form and alumina spacers can be formed with a sintering process. Plastics such as PTFE and PEEK can be thermoformed and/or machined. Ceramics, including alumina base ceramics, can also be formed using normal ceramics process such as molding and firing.

It is also desirable in most applications that the inner rod sections 101, 102 be electrically conductive. Forming the washer from the same material as the rod sections can improve measurement accuracy. Forming the threaded rod from the same material as the rod sections can help prevent unwanted reflections, although a different material having a different coefficient of expansion can lock the rod sections together when the assembly is heated or cooled.

Some embodiments can have the threaded rod as an extension of a rod section. For example, a metal rod can be formed into an inner rod section by cutting in external threads on one end, tapping internal threads on the other end, and grinding the flats.

Figure 2:
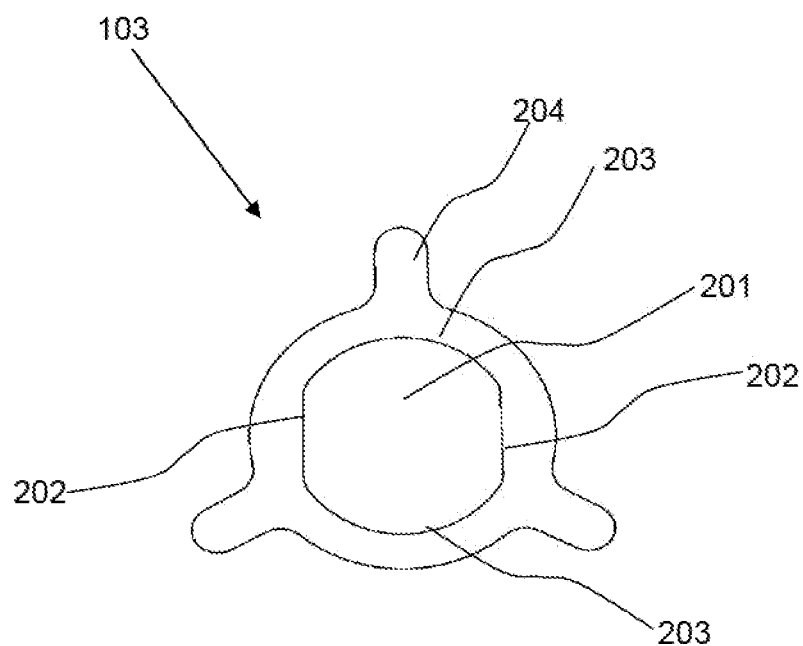
FIG. 2 illustrates a front view of a spacer in accordance with aspects of the embodiments.

FIG. 2 illustrates a front view of a spacer 103 in accordance with aspects of the embodiments. The spacer has a bore 201 for slipping onto a rod end 109 and positioners 204 for centering the spacer 103 on an outer tube. The bore 201 has flat sections 202 matching flats 105. The bore 201 also has curved sections 203 matching the curved areas of the rod end 109.

Figure 3:
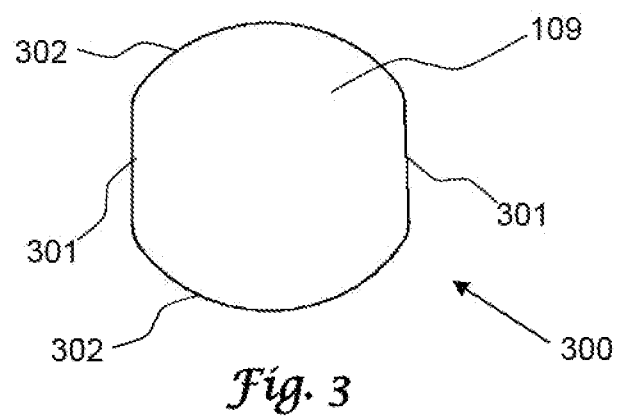
FIG. 3 illustrates a non-circular cross-section of a rod end of an inner rod section in accordance with aspects of the embodiments.

FIG. 3 illustrates a non-circular cross-section 300 of a rod end 109 of an inner rod section 101, 102 in accordance with aspects of the embodiments. The non-circular cross-section 300 has flat sections 301 and curved sections 302 matching the inner bore's flat section 202 and the inner bore's curved sections 203. As such, the spacer 103 can be slid or pressed onto rod end 109.

Figure 4:
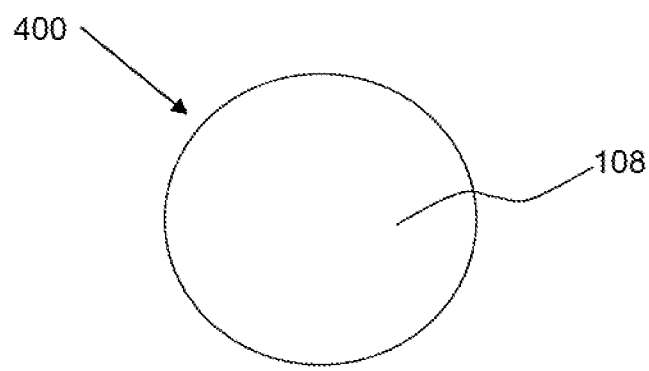
FIG. 4 illustrates a circular cross-section of a rod body of an inner rod section in accordance with aspects of the embodiments.

FIG. 4 illustrates a circular cross-section 400 of a rod body 108 of an inner rod section 101, 102 in accordance with aspects of the embodiments.

Figure 5:
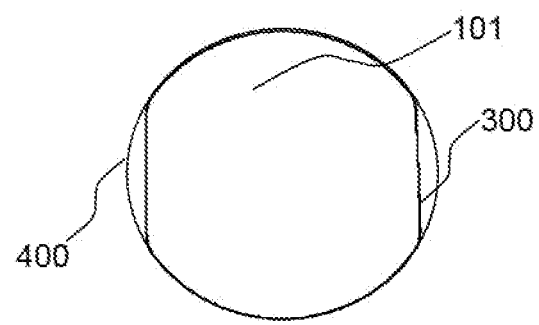
FIG. 5 illustrates an end view of an inner rod section in accordance with aspects of the embodiments.

FIG. 5 illustrates an end view of an inner rod section 101, 102 in accordance with aspects of the embodiments. The rod end's cross-section 300 can be seen in front of the rod body's cross-section 400. It is therefore apparent a spacer 103 having an inner bore 201 matching a rod end 109 cannot slide onto or be non-destructively pushed onto a rod body 109.

Figure 6:
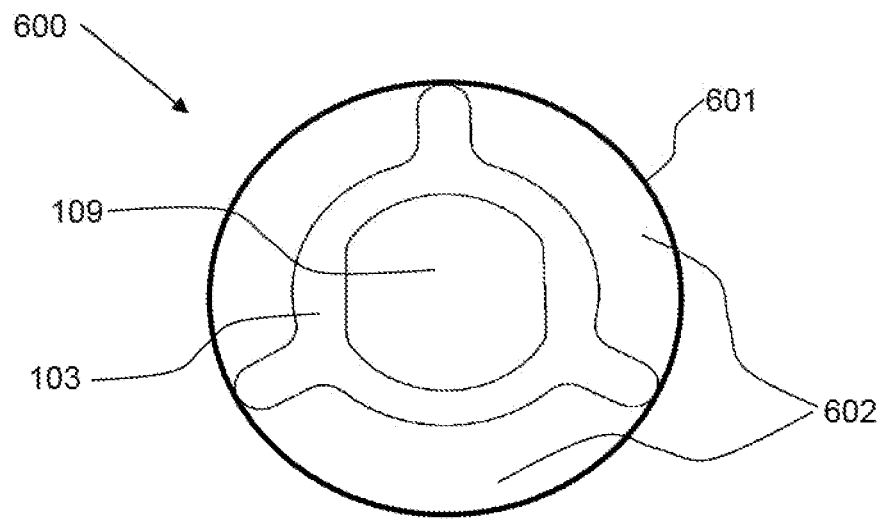
FIG. 6 illustrates a cut view of a coaxial probe in accordance with aspects of the embodiments.

FIG. 6 illustrates a cut view of a coaxial probe 600 in accordance with aspects of the embodiments. The view is cut through a spacer 103 that has been slid onto a rod end 109. The spacer 103 is centering the rod end 109, and therefore also the inner rod assembly, within outer tube 601. Flow channels 602 between the positioners 204 allow fluid inside the coaxial probe 600 to flow past the spacer.

Figure 7:
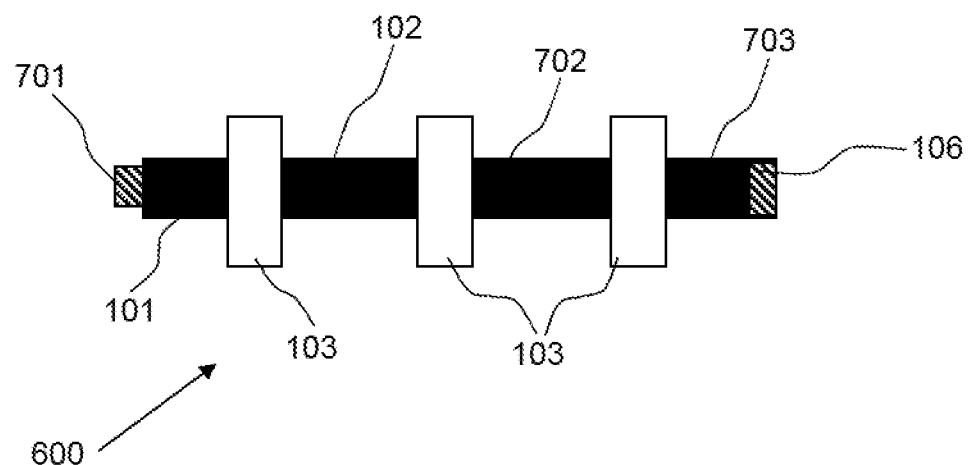
FIG. 7 illustrates an inner rod assembly for a coaxial probe in accordance with aspects of the embodiments.

FIG. 7 illustrates an inner rod assembly 700 for a coaxial probe in accordance with aspects of the embodiments. The illustrated inner rod assembly has four inner rod sections 101, 102, 702, 703 with spacers 103 installed on the ends of three of the inner rod sections. Inner rod section 101 is illustrated as having an external thread formed as part of the inner rod section 101 itself. Inner rod section 703 is illustrated as having internal threads 106 cut directly into the inner rod section 703 itself. In most applications, external threads 701 are formed to match internal threads 106 such that any inner rod section can be joined to any other inner rod section.

Figure 8:
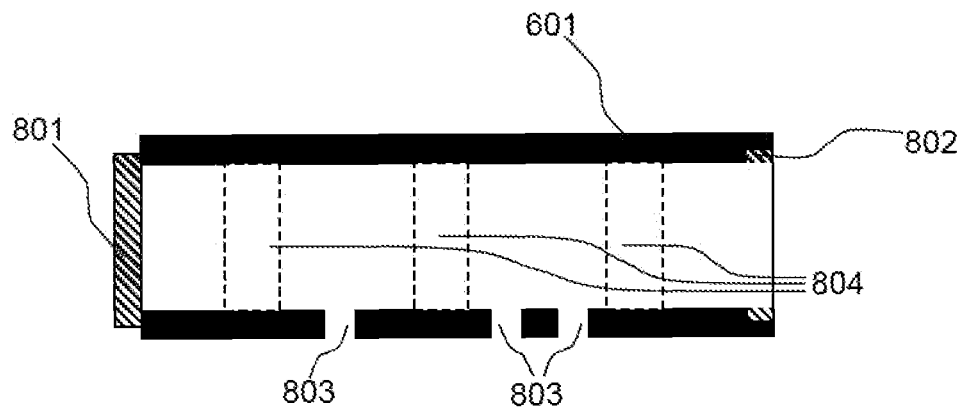
FIG. 8 illustrates a cut view of an outer tube for a coaxial probe with spacers positions indicated in accordance with aspects of the embodiments.

FIG. 8 illustrates a cut view of an outer tube 601 for a coaxial probe with spacer positions 804 indicated in accordance with aspects of the embodiments. An outer tube 601 can be a single piece or can be formed by joining a number of outer tube sections. As illustrated, one end of outer tube 601 has external thread 801 while the other end has internal threads 802. As such, outer tube 601 can be lengthened by threading on additional outer tube sections. Outer tube 601 has a number of perforations 803 that can allow a fluid to flow into out tube 601 and therefore also into the volume between outer tube 601 and a coaxial probe's inner rod. For illustrative purposes, spacer positions 804 are indicated to clarify the positioning of an inner rod assembly inside an outer tube. Alternatively, the outer tube can have external threads on both ends and use a coupler with internal threads to join the segments.

Figure 9:
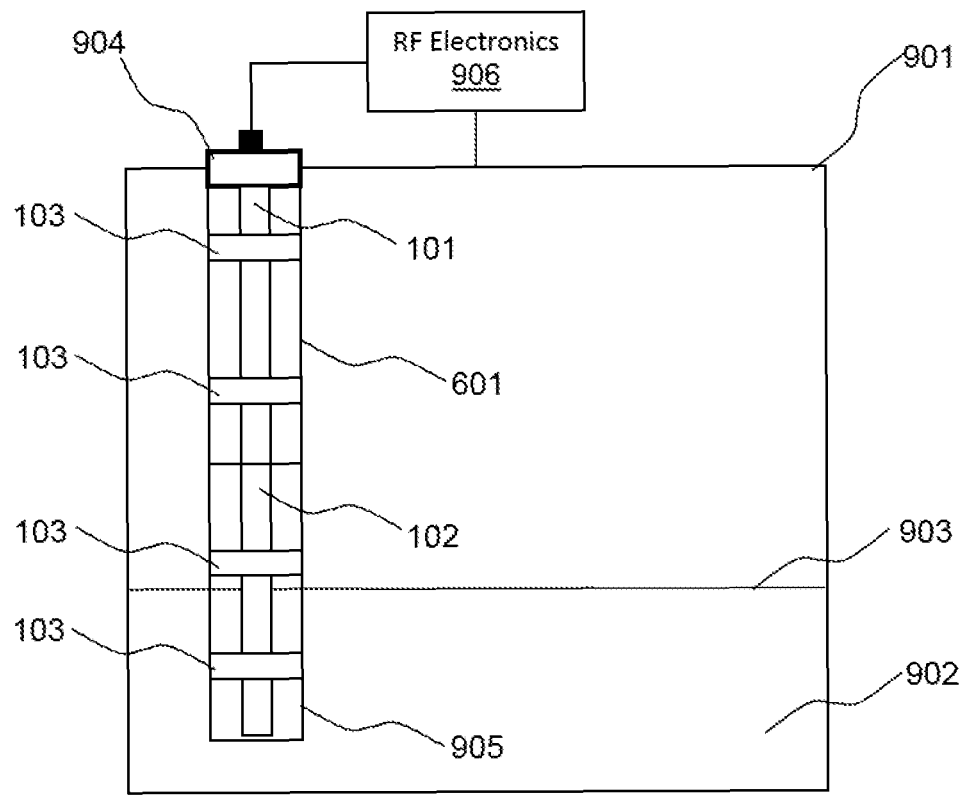
FIG. 9 illustrates a cut view of a coaxial probe installed on a fully enclosed tank containing a fluid in accordance with aspects of the embodiments.

FIG. 9 illustrates a cut view of a coaxial probe installed on a fully enclosed tank 901 containing a fluid 902 in accordance with aspects of the embodiments. The fluid 902 has a top surface 903 at a level to be detected by the coaxial probe. Radio Frequency (RF) electronics 906 can be grounded to the tank 901 and can pass an RF signal to connector 904 which couples the signal into the coaxial probe. The coaxial probe has an outer tube made of outer tube sections 601, 905 and an inner rod made of numerous inner rod sections 101, 102. Spacers 103 center the inner rod within outer tube 601. When in use, the RF signal travels down the coaxial probe and is at least partially reflected at fluid surface 903 because the coaxial tube acts as a transmission line and there is an impedance change at the fluid surface 903.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A coaxial probe for a guided wave radar (GWR) level measurement system, the coaxial probe comprising:
   a first inner rod section comprising a first rod body and a first rod end located at one end of the first inner rod section, wherein the first rod end comprises internal threads and diametrically opposed flats, wherein the first rod body has a circular cross-section, and wherein the first rod end has a first non-circular cross-section;
   a spacer having an inner bore and a plurality of flow channels wherein the inner bore is shaped and dimensioned to slide onto the first rod end, wherein the inner bore is shaped and dimensioned such that it cannot slide completely onto the first rod body, and wherein the spacer is positioned onto the first rod end;
   a second inner rod section comprising a second rod body and a second rod end located at one end of the second inner rod section, wherein the second rod end comprises internal threads and diametrically opposed flats, wherein the second rod body has the circular cross-section, and wherein the second rod end has a non-circular cross-section;
   a threaded rod threaded into the first rod end and into the second rod end to thereby join the first inner rod section and the second inner rod section; and
   an outer tube wherein the first inner rod section, the second inner rod section, and the spacer are positioned inside the outer tube, wherein the spacer centers the first inner rod section and the second inner rod section within the outer tube, and wherein the flow channels allow a fluid inside the outer tube to flow past the first inner rod section and past the spacer and to the second inner rod section.

2. The coaxial probe of claim 1 further comprising a washer wherein the threaded rod passes through a hole in the washer, wherein the washer is sized to prevent the spacer from sliding onto the second rod end.

3. The system of claim 2 wherein the washer is a lock washer.

4. The system of claim 3 wherein an outer diameter of the washer is equal to or less than the circular cross-section's diameter.

5. The coaxial probe of claim 4 wherein the outer tube is perforated along its length to thereby allow the fluid to flow into and out of the outer tube.

6. The coaxial probe of claim 5 wherein the outer tube, the first inner rod section, the second inner rod section, and the washer are formed from a superalloy.

7. The coaxial probe of claim 1 wherein the spacer is formed from PTFE or PEEK.

8. The coaxial probe of claim 5 further comprising a radio frequency (RF) connector comprising an RF signal input and a ground input wherein the RF signal input is configured to pass an RF signal directly to the first inner rod section or to the second inner rod section.

9. A coaxial probe for a guided wave radar (GWR) level measurement system, the coaxial probe comprising:
   a first inner rod section comprising a first rod body and a first rod end located at one end of the first inner rod section, wherein the first rod end comprises internal threads and diametrically opposed flats, wherein the first rod body has a circular cross-section, and wherein the first rod end has a first non-circular cross-section;
   a spacer having an inner bore and a plurality of flow channels wherein the inner bore is shaped and dimensioned to slide onto the first rod end, wherein the inner bore is shaped and dimensioned such that it cannot slide completely onto the first rod body, and wherein the spacer is positioned onto the first rod end;
   a second inner rod section comprising a second rod body, a second rod end, and a threaded rod wherein the threaded rod extends from one end of the second inner rod section, wherein the second rod end is between the threaded rod and the second rod body, wherein the second rod end comprises diametrically opposed flats, wherein the second rod body has the circular cross-section, wherein the second rod end has a non-circular cross-section, and wherein the threaded rod is threaded into the internal threads to thereby join the first inner rod section, the spacer, and the second inner rod section together; and an outer tube wherein the first inner rod section, the second inner rod section, and the spacer are positioned inside the outer tube, wherein the spacer centers the first inner rod section and the second inner rod section within the outer tube, and wherein the flow channels allow a fluid inside the outer tube to flow past the first inner rod section and past the spacer and to the second inner rod section.

10. The coaxial probe of claim 9 further comprising a washer wherein the external threads pass through a hole in the washer, and wherein the washer is sized to prevent the spacer from sliding onto the second rod end.

11. The system of claim 10 wherein the washer is a lock washer.

12. The system of claim 11 wherein an outer diameter of the washer is equal to or less than the circular cross-section's diameter.

13. The coaxial probe of claim 12 wherein the outer tube is perforated along its length to thereby allow the fluid to flow into and out of the outer tube.

14. The coaxial probe of claim 13 wherein the outer tube, the first inner of rod section, the second inner rod section, and the washer are formed from a superalloy.

15. The coaxial probe of claim 9 wherein the spacer is formed from ceramic or aluminum oxide.

16. The coaxial probe of claim 9 further comprising a radio frequency (RE) connector comprising an RF signal input and a ground input wherein the RF signal input is configured to pass an RE signal directly to the first inner rod section or to the second inner rod section.

17. A method for assembling a coaxial probe, the method comprising:

obtaining a first inner rod section wherein the first inner rod sections comprises a first rod body and a first rod end located at one end of the first inner rod section, wherein the first rod end comprises diametrically opposed flats, wherein the first rod body has a circular cross-section, and wherein the first rod end has a first non-circular cross-section;

sliding a spacer onto the first rod end wherein the spacer comprises an inner bore and a plurality of flow channels wherein the inner bore is shaped and dimensioned to slide onto the first rod end, wherein the inner bore is shaped and dimensioned such that it cannot slide completely onto the first rod body;

attaching a second inner rod section end-to-end to the first inner rod section wherein the second inner rod section comprises a second rod body and a second rod end, wherein the second rod end comprises diametrically opposed flats, and wherein the second rod body has the circular cross-section; and sliding the first inner rod section, the spacer, and the second inner rod section into an outer tube, wherein the spacer centers the first inner rod section and the second inner rod section within the outer tube, and wherein the flow channels allow a fluid inside the outer tube to flow past the first inner rod section and past the spacer and to the second inner rod section.

18. The method for assembling a coaxial probe of claim 17, the method further comprising placing a washer between the first inner rod section and the second inner rod section to thereby prevent the spacer from sliding off the first rod end.

19. The method for assembling a coaxial probe of claim 17 further comprising using a wrench to tighten the first rod end to the second rod end, wherein the first rod end and the second rod end are attached by a threaded rod, and wherein the wrench is dimensioned to match the diametrically opposed flats of the first rod section or the second rod section.

20. The method for assembling a coaxial probe of claim 17 further comprising attaching a radio frequency (RF) connector to the first inner rod section and to the outer tube such that the RF connector is configured to couple a radio frequency signal source to the coaxial probe.

* * * * *